Nov. 22, 1955  L. KUBOSKE  2,724,283

SPEED REDUCING AND POWER TRANSMITTING UNIT

Filed Dec. 5, 1952

INVENTOR
LEO KUBOSKE
BY Charles S. Evans
his ATTORNEY

United States Patent Office 2,724,283
Patented Nov. 22, 1955

2,724,283

SPEED REDUCING AND POWER TRANSMITTING UNIT

Leo Kuboske, Woodside, Calif.

Application December 5, 1952, Serial No. 324,249

1 Claim. (Cl. 74—425)

My invention relates to a speed reducing and power transmitting implement of special usefulness in rotating the cutting tool of a ridge reamer when reconditioning an internal combustion engine cylinder.

One of the objects of my invention is the provision of a unit of the character described which is interposed between a source of power such as a high speed electric drill motor, and a cutting tool requiring low R. P. M., such as a ridge reamer.

Another object is the provision of such a unit which is a readily portable, small and compact implement.

The invention possesses other objects, some of which with the foregoing will be brought out in the following description of the invention. I do not limit myself to the showing made by the said description and the drawings, since I may adopt variant forms of the invention within the scope of the appended claim.

Referring to the drawings:

Figs. 2 and 3 are drawn to actual size.

In broad terms, my speed reducing and power transmitting unit comprises a generally flat housing in which is enclosed a worm and worm gear in constant mesh. Both the worm and worm gear are journaled directly in the housing, and means are provided integral with the worm and extending out of the housing for operative connection to a source of rotary power. A socket formed in the worm gear and accessible from the outside of the housing provides operative connection of the unit to the driving stud or shank of a rotary cutting tool such as a ridge reamer.

When an automobile engine is overhauled, and before the pistons are removed, it is necessary to remove the ridge which forms at the top of each cylinder as a result of wear and the adherence of carbon. To assist the mechanic in removing the ridge, a number of different types of hand operated ridge reamers are available.

Figures 2, 3:
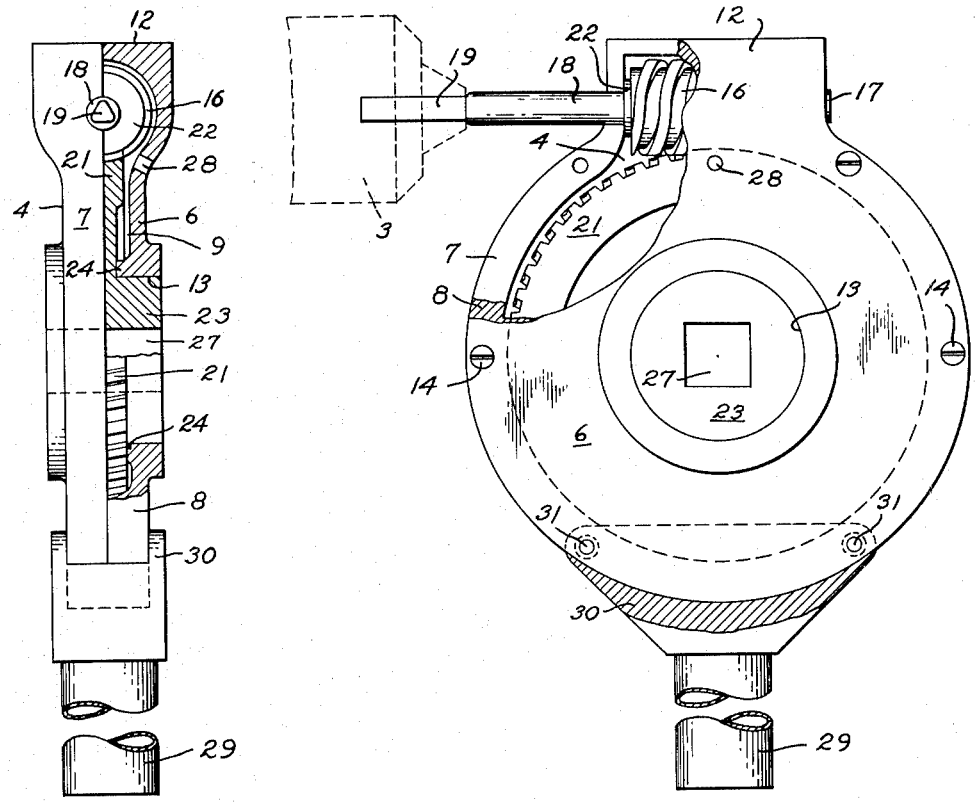
Fig. 2 is a front elevation with the housing on one side partly broken away to disclose the method of journalling the worm gear.
Fig. 3 is a plan view with the housing broken away to disclose the worm and worm gear.
Figure 1:
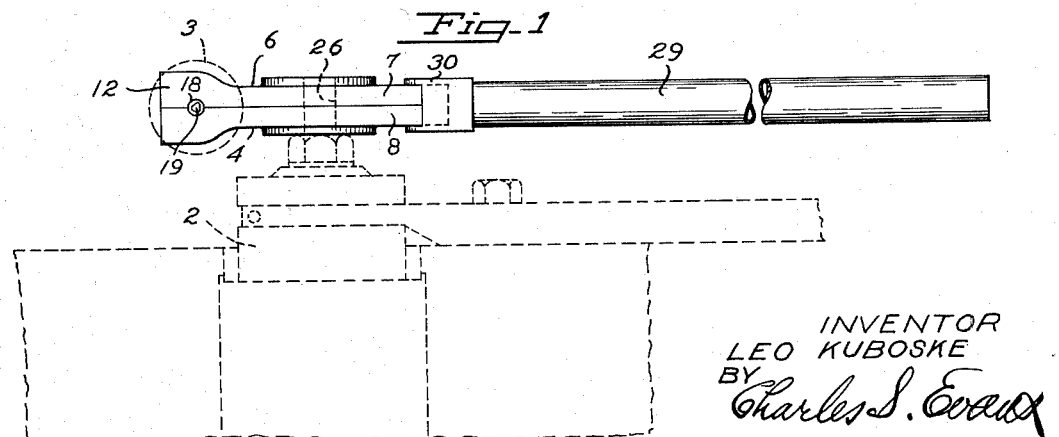
Fig. 1 is an elevation showing the application of my unit to a ridge reamer, the latter shown in dashed lines in position of use on an engine block. The figure is drawn to a scale approximately ½ actual size.

To eliminate the slow and tedious hand operation, my unit is interposed between a ridge reamer 2, shown in dash lines in Fig. 1, and an outside source of rotary power, such as the chuck 3 of a drill motor, shown in dash lines in Figs. 1 and 3.

The unit comprises a housing made up of two substantially identical plates 4 and 6, which are provided with thick integral peripheral flanges 7 and 8, respectively, the outer edges of which abut when the plates are assembled to form the housing. The flanges are of such height as to provide a hollow 9 between the plates when the flanges are abutted to form the housing.

Each of the plates is provided with a substantially tangentially positioned housing extension 12 forming an integral part of each plate, and being flanged in continuation of the flange on the plate. The plates are each further provided with a bore 13 passing therethrough at about their midpoint, the bore in each plate being aligned with the bore in the other plate when the plates are oppositely positioned and secured in abutting relationship by the screws 14.

With the plates in assembled position, the housing extension 12 provides an enclosure for a worm 16 journaled at both ends between the flanges 7 and 8. The journal at one end is a stub shaft 17; and at the other end is extended in the shaft 18, terminating in a triangular shaped shank 19, adapted to be operatively engaged by the three-jaw chuck 3, commonly used on drill motors. The thrust of the worm as it rotates the worm gear 21 is carried by a pad 22 on the worm bearing against the inside surfaces of the flanges.

The worm gear 21 is positioned within the hollow housing so as to be constantly in mesh with the worm; and is journaled directly on and between the plates in the bores 13 by a hub 23 formed integrally on the gear. A pad 24 built up on the inside of each plate surrounding the bore maintains the worm gear in operative alignment with the worm.

In order to operatively connect the worm gear to the stud 26 on the reamer, a socket 27 is provided extending through the hub 23. The socket is conveniently formed directly in the hub of the gear as shown.

For lubrication, a small hole 28 is provided in one of the plates adjacent the housing extension, so that lubricating oil may be introduced at the point of greatest friction.

When my unit is connected to a reamer and the power applied, a substantial amount of torque in the opposite direction is applied to the housing. To resist this torque, I provide a stop, conveniently a bar 29 flared out at one end in the yoke 30 within which the housing is secured by screws 31. The stop bar is adapted to abut any adjacent structural element of the automobile, such as a temporarily set head bolt.

Thus, it will be apparent that when power is applied to the shank 19, the worm will rotate the worm gear and the reamer connected thereto, while the housing is held stationary by the stop bar.

I claim:

A speed reducing and power transmitting unit for driving a rotary cutting tool comprising a pair of like housing plates having peripheral flanges thereon, said plates having bearings centrally arranged therein and said flanges forming a bearing therebetween, a worm journaled in said bearing flanges, a worm gear meshing with the worm and journaled in the plate bearings, means for holding the flanged plates together in a housing about the worm and worm gear, socket means in the worm gear for operative connection of the unit to a rotary cutting tool, a stub shank extending from the worm and supported solely by the worm and worm bearing for operative connection of the unit to a source of power, and a stop bar having on one end a pair of flared and bifurcated yoke arms fixedly enclosing a portion of the peripheral edge of the housing plates diametrically opposite the worm bearing.

References Cited in the file of this patent

UNITED STATES PATENTS

| 685,544 | Weimar | Oct. 29, 1901 |
| 1,110,455 | Nelson | Sept. 15, 1914 |
| 1,781,083 | Schmick | Nov. 11, 1930 |
| 1,834,145 | Connell | Dec. 1, 1931 |